United States Patent [19]

Yoshisaka et al.

[11] Patent Number: 5,400,017
[45] Date of Patent: Mar. 21, 1995

[54] TRANSMISSION APPARATUS

[75] Inventors: Keiichi Yoshisaka; Kouji Uchida; Kiyoshi Shima; Masaharu Sogabe, all of Osaka, Japan

[73] Assignee: Daikin Industries, Ltd., Osaka, Japan

[21] Appl. No.: 992,654

[22] Filed: Dec. 18, 1992

[30] Foreign Application Priority Data

Dec. 20, 1991 [JP] Japan ................... 3-338711
Apr. 3, 1992 [JP] Japan ................... 4-082219

[51] Int. Cl.$^6$ .................. G05B 23/02; H02B 1/24; H04B 3/00
[52] U.S. Cl. .................. 340/825.06; 340/825; 307/127; 375/36
[58] Field of Search .............. 340/825.06, 825.59, 340/825.77, 825.78, 870.15, 870.16; 370/78; 375/113; 307/38, 39, 40, 41, 42, 127, 128; 328/118

[56] References Cited

U.S. PATENT DOCUMENTS

| | | | |
|---|---|---|---|
| 4,647,912 | 3/1987 | Bates et al. | 340/825.06 |
| 5,182,466 | 1/1993 | Ohkubo | 307/127 |
| 5,194,758 | 3/1993 | Ver Meer | 307/127 |
| 5,233,602 | 8/1993 | Kuwano | 340/825.06 |
| 5,257,160 | 10/1993 | Yokohama et al. | 375/36 |

FOREIGN PATENT DOCUMENTS

| | | | |
|---|---|---|---|
| 55-38721 | 3/1980 | Japan | 370/78 |
| 1144753 | 6/1989 | Japan . | |
| 1288133 | 11/1989 | Japan . | |
| 2054697 | 2/1990 | Japan . | |
| 2104197 | 4/1990 | Japan . | |

Primary Examiner—Donald J. Yusko
Assistant Examiner—Mark H. Rinehart
Attorney, Agent, or Firm—Sixbey, Friedman, Leedom & Ferguson

[57] ABSTRACT

A transmission device is disclosed wherein a plurality of control units each having a transmitting/receiving block connected to one another through a positive signal line and a negative signal line, and bidirectional signal transmission is carried out with a predetermined polarity among the control units. The signal lines of the transmission device are connected to a power superposing source for applying a predetermined DC voltage to the signal lines and each of the control units include a signal switch connected to the transmitting/receiving block for inverting and switching a transmission signal sent or received by the transmitting/receiving block, and a polarity judging device adapted to supply a homopolar signal when the potential of the positive signal line is higher than the potential of the negative signal line, and adapted to supply a heteropolar signal when the potential of the positive signal line is lower than the potential of the negative signal line. The control unit further includes a changeover control adapted to supply a switching signal to the signal switch such that the signal switch inverts and switches the transmission signal, when the polarity judging device supplies a heteropolar signal.

3 Claims, 10 Drawing Sheets

TRANSMISSION APPARATUS

DESCRIPTION OF THE PRIOR ART

The present invention relates to a transmission apparatus for transmitting a signal between at least two control units, and more particularly to a measure for non-polarizing a transmission signal.

For example, there is known an air conditioning machine using a balance transmission system as a signal transmission system among a remote control, an indoor device and an outdoor device. The balance transmission system is a system in which, by a difference in potential between two signal lines, a transmission signal is formed and transmitted.

In such an air conditioning machine, however, signal transmission is carried out with a predetermined polarity. If the polarities of signal lines are not conformed to predetermined ones due to erroneous line connection, data contents cannot be read accurately.

In this connection, provision may be made such that a driver and a receiver are connected to a remote control through an analog switch and that, when an input signal is heteropolar, the ports of the driver and the receiver are switched by the analog switch to conform the polarity of a transmitted output to the polarity of a received input, as disclosed in Japanese Patent Laid-Open Publication No. 1-288133.

In the transmission apparatus of this air conditioning machine, however, whether or not the polarity of a transmission signal is conformed to a predetermined one is judged whether or not the format of the transmission signal is a predetermined format. Accordingly, unless an indoor control unit or the like sends a control signal, the polarity conformity cannot be disadvantageously judged.

Accordingly, at the time of installation, the polarity conformity cannot be judged at the point of time when the wiring has merely finished. This presents the problem that the efficiency of execution is low.

In view of the foregoing, the present invention is proposed with the object of providing a transmission apparatus which facilitates polarity judgment to improve the efficiency of execution.

SUMMARY OF THE INVENTION

To achieve the object above-mentioned, the present invention is arranged such that a direct current voltage is applied to signal lines to judge the polarities thereof.

More specifically, the present invention relates to a transmission apparatus, as shown in FIG. 1, in which a plurality of control units 12 each having transmitting-/receiving means 4 are connected to one another through a positive signal line 21 and a negative signal line 22, and in which bidirectional signal transmission is carried out with a predetermined polarity among the control units 12.

Connected to the signal lines 21, 22 is power superposing means 6 for applying a predetermined DC voltage of the signal lines 21, 22. Each control unit 12 has (i) signal switching means 5 connected to the transmitting-/receiving means 4 for inverting and switching a transmission signal sent or received by the transmitting-/receiving means 4, (ii) polarity judging means 7 adapted to supply a homopolar signal when the potential of the positive signal line 21 is higher than the potential of the negative signal line 22, and adapted to supply a heteropolar signal when the potential of the positive signal line 21 is lower than the potential of the negative signal line 22, and (iii) changeover control means 31 adapted to supply a switching signal to the signal switching means 5 such that the signal switching means 5 inverts and switches the transmission signal, when the polarity judging means 7 supplies a heteropolar signal.

The polarity judging means 7 has a first light emitting element (PHD1) adapted to emit light when the potential of the positive signal line 21 is higher, a second light emitting element (PHD2) adapted to emit light when the potential of the negative signal line 22 is higher, a first light receiving element (PHT1) adapted to supply a homopolar signal when the first light emitting element (PHD1) emits light, and a second light receiving element (PHT2) adapted to supply a heteropolar signal when the second light emitting element (PHD2) emits light.

The polarity judging means 7 is formed by a voltage dividing circuit 71 which is connected to the positive signal line 21 to divide the voltage thereof and which is adapted to supply a high-voltage homopolar signal when the potential of the positive signal line 21 is higher and adapted to supply a low-voltage heteropolar signal when the potential of the negative signal line 22 is higher.

The polarity judging means 7 has a positive-side judging unit 73 arranged such that a first transistor Q1 is conducted to supply a homopolar signal when the potential of the positive signal line 21 is higher, and a negative-side judging unit 74 arranged such that a second transistor Q2 is conducted to supply a heteropolar signal when the potential of the negative signal line 22 is higher.

The polarity judging means 7 has (i) the first transistor Q1 of the positive-side judging unit 73 in which the base is connected to the positive signal line 21, the collector is connected to the changeover control means 31 and the emitter is connected to the negative signal line 22 and the ground, (ii) the second transistor Q2 of the negative-side judging unit 74 in which the base is connected to the negative signal line 22, the collector is connected to the changeover control means 31 and the emitter is connected to the positive signal line 21 and the ground, and (iii) a pull-up circuit 76 connected to the collectors of the first transistor Q1 and the second transistor Q2.

According to the arrangement above-mentioned, each control unit 12 supplies and receives a variety of transmission signals through the positive signal line 21 and the negative signal line 22. In an air conditioning machine for example, the indoor control units 12 supply and receive control signals to and from a remote control 13.

At the time of power ON or the like, the power superposing means 6 applies a predetermined DC voltage, e.g., +15 V, to both signal lines 21, 22. Then, when the potential of the positive signal line 21 is higher than the potential of the negative signal line 22, the polarity judging means 7 supplies a homopolar signal, and when the potential of the positive signal line 21 is lower than the potential of the negative signal line 22, the polarity judging means 7 supplies a heteropolar signal.

More specifically, when the potential of the positive signal line 21 is higher than the potential of the negative signal line 22, the first light emitting element (PHD1) emits light and the first light receiving element (PHT1) supplies a homopolar signal. When the potential of the positive signal line 21 is lower than the potential of the negative signal line 22, the second light emitting element (PHD2) emits light and the second light receiving element (PHT2) supplies a heteropolar signal.

Alternatively, the present invention may be arranged such that the voltage dividing circuit 71 supplies a high-voltage homopolar signal when the potential of the positive signal line 21 is higher than the potential of the negative signal line 22, and that the voltage dividing circuit 71 supplies a low-voltage heteropolar signal when the potential of the positive signal line 21 is lower than the potential of the negative signal line 22.

Also, the present invention may be arranged such that the first transistor Q1 of the positive-side judging unit 73 is turned ON to supply a low-level homopolar signal to the changeover control means 31 when the potential of the positive signal line 21 is higher than the potential of the negative signal line 22, and that the second transistor Q2 of the negative-side judging unit 74 is turned ON to supply a low-level heteropolar signal to the changeover control means 31 when the potential of the positive signal line 21 is lower than the potential of the negative signal line 22.

When the polarity judging means 7 supplies a heteropolar signal, the heteropolar signal is received by the changeover control means 31 to switch the signal switching means 5. When the signal switching means 5 is switched, a signal from the transmitting/receiving means 4 is supplied as inverted. Thus, signal transmission among the control units 12 can be conducted with the polarity conformed to a predetermined one.

According to the present invention, a DC voltage is applied to the signal lines 21, 22, and the polarity conformity is judged. When the polarity is not conformed to a predetermined one, the transmission signal is inverted. Thus, the polarity can be accurately conformed to a predetermined one, and the polarity judgment can be made without a transmission signal supplied. This improves the efficiency of execution at the time of installation or the like.

Further, when the light emitting elements (PHD1, PHD2) and the light receiving elements (PHT1, PHT2) are used, a homopolar signal and a heteropolar signal can be fetched without the use of A/D ports of a microcomputer or the like. It is therefore possible to utilize the A/D ports of great utility value as input ports of other control signal.

Further, when the voltage dividing circuit 71 is disposed, the polarity conformity can be judged with a less current consumption.

Further, when the polarity is judged based on ON-/OFF signals of the first transistor Q1 and the second transistor Q2, the polarity conformity can be judged with a less current consumption and general-purpose ports of a microcomputer can be used. Thus, the A/D ports of great utility value can be used as input ports of other control signal.

DESCRIPTION OF THE PREFERRED EMBODIMENTS

The following description will discuss in detail embodiments of the present invention with reference to the attached drawings.

Figure 1:
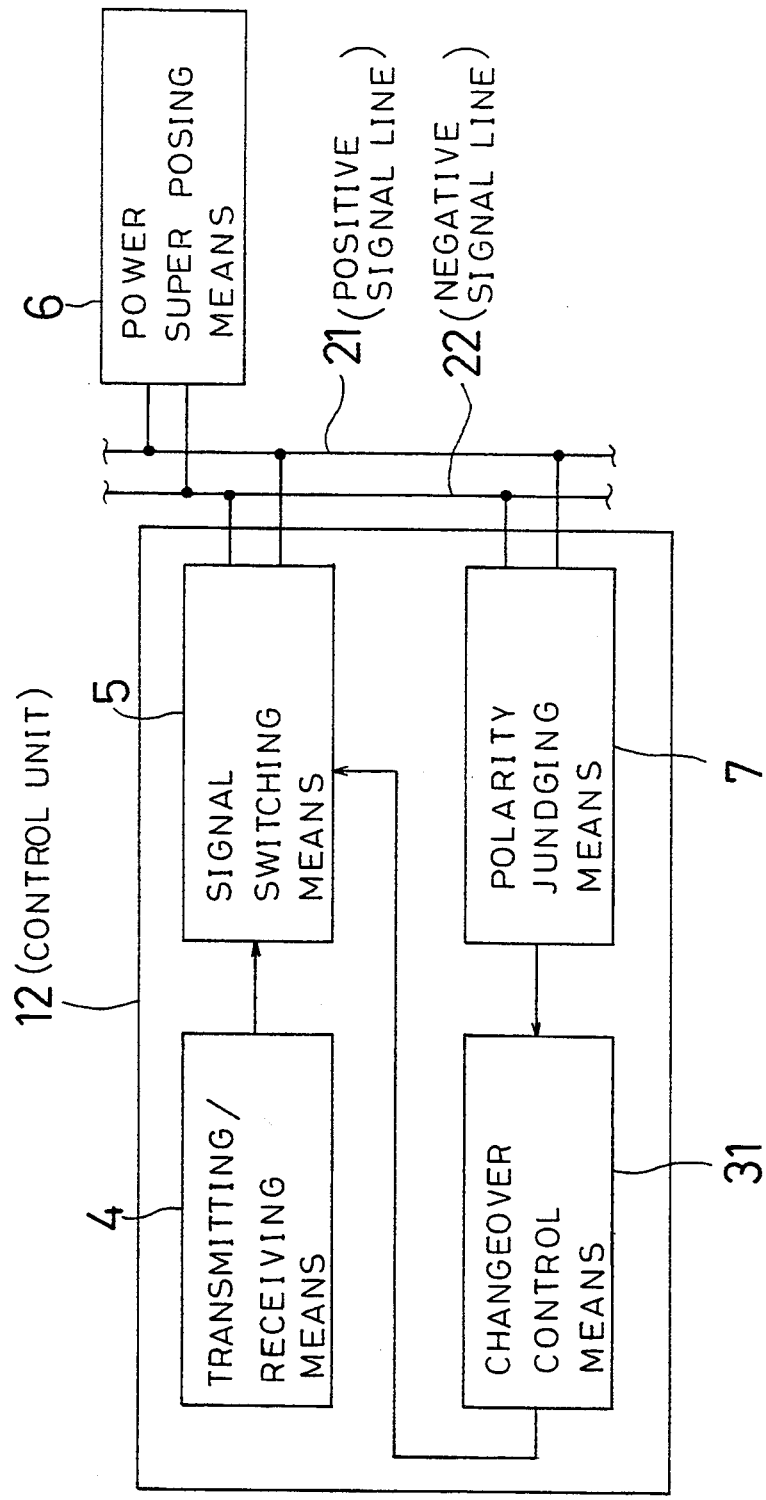
FIG. 1 is a block diagram showing the arrangement of the present invention.
Figure 2:
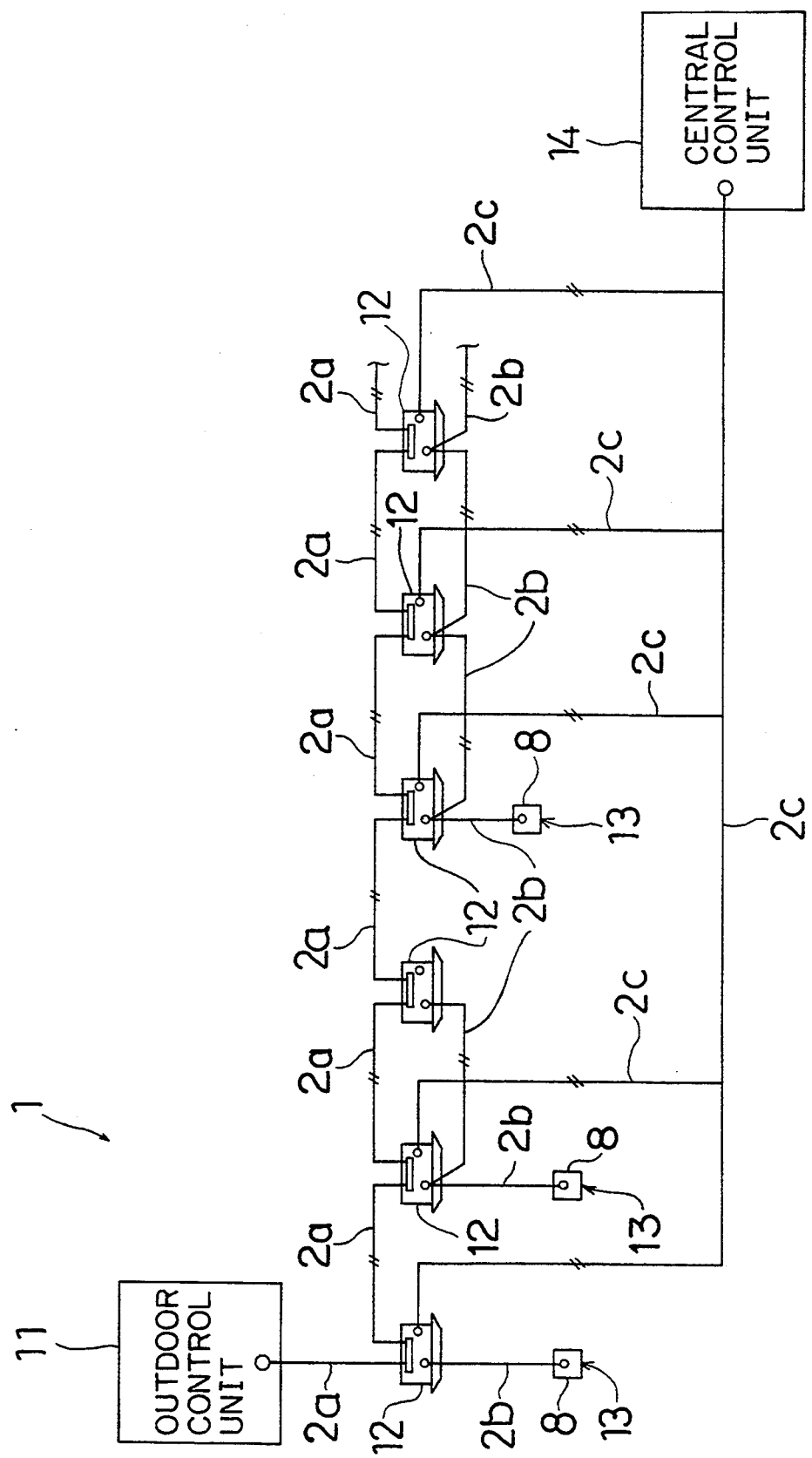
FIG. 2 is a view of the control system of an air conditioning machine.

FIG. 2 shows the control system of an operation control device 1 in an air conditioning machine. A plurality of indoor control units 12 are successively connected to an outdoor control unit 11 by two signal lines 2a. Control signals are transmitted between the outdoor control unit 11 and the indoor control units 12. The indoor control units 12 are divided into a plurality of groups. By two signal lines 2b, a remote control 13 is connected to each group of the indoor control units 12. Control signals are transmitted between the indoor control units 12 and the remote controls 13. A central control unit 14 is connected to the indoor control units 12 by two signal lines 2c. Control signals are transmitted between the control units 12 and the central control unit 14.

The system of signal transmission among the outdoor control unit 11, the indoor control units 12, the remote controls 13 and the central control unit 14 is a balance transmission system of the AMI (Alternate mark inversion) type, in which there is carried out a half-duplex signal transmission with a predetermined polarity.

Figure 3:
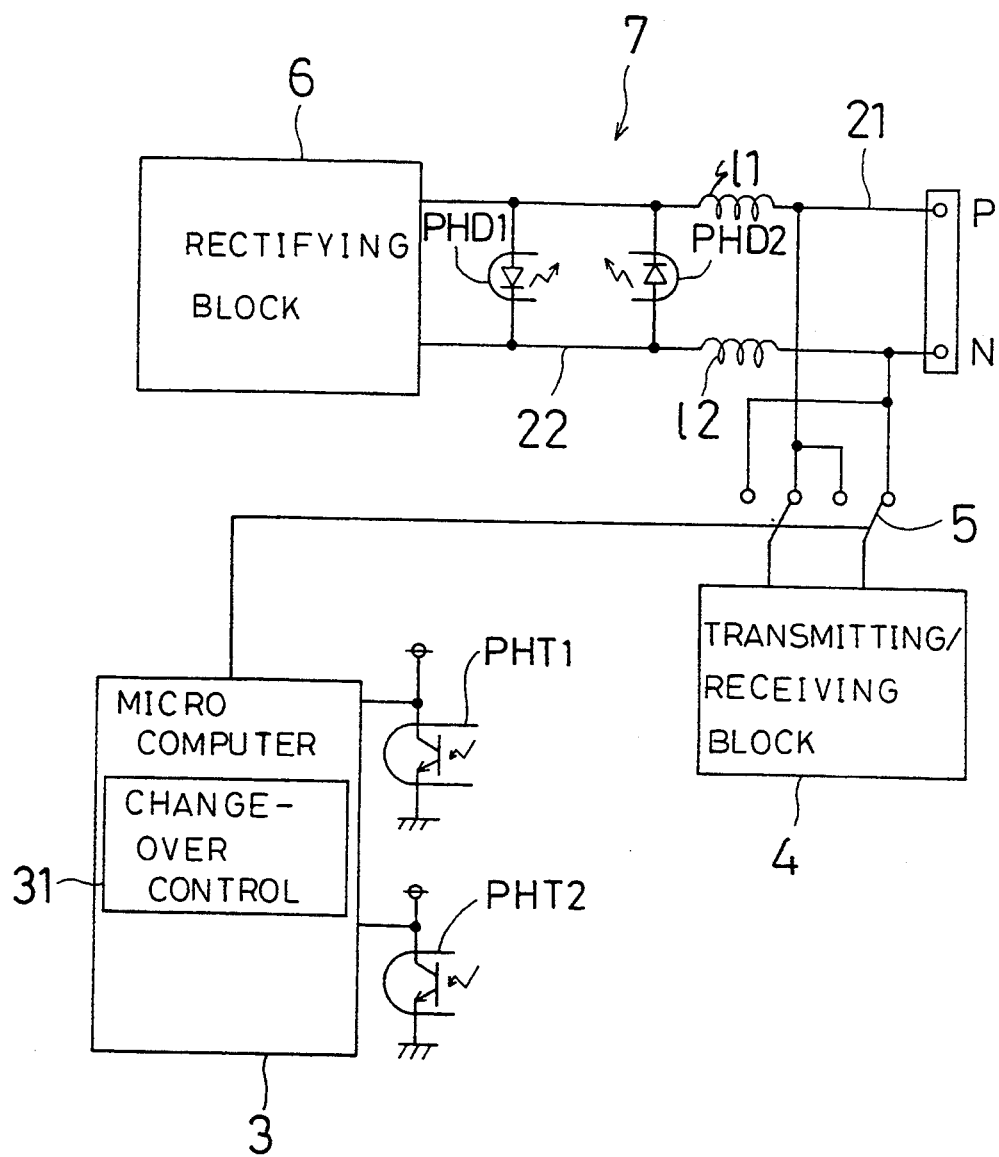
FIG. 3 is a schematic circuit diagram of an indoor control unit.

As shown in FIG. 3, each of the indoor control units 12 has a microcomputer 3 and a transmitting/receiving block 4 serving as transmitting/receiving means. Although not shown, each of the outdoor control unit 11, the remote controls 13 and the central control unit 14 has a microcomputer 3 and a transmitting/receiving block 4 which have respective arrangements similar to those disposed in each indoor control unit 12, to be discussed below. The following will discuss the circuit arrangement of each of the indoor control units 12 as an example, as well as signal transmission between the indoor control unit 12 and the remote control 13. The signal lines 2b are composed of a positive signal line 21 and a negative signal line 22.

Figure 9:
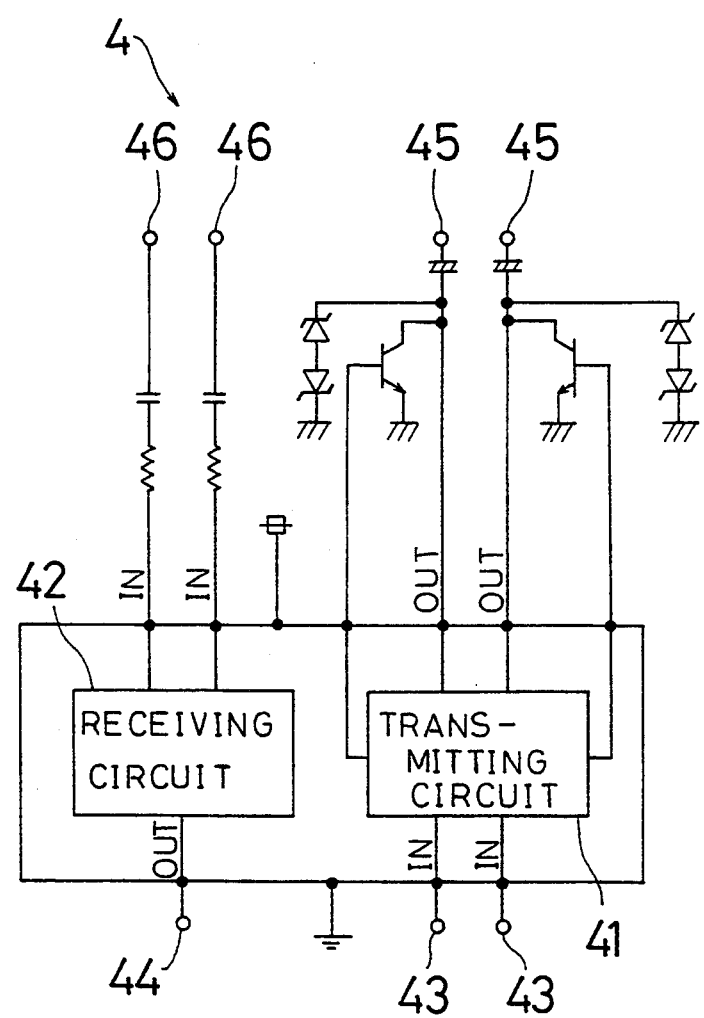
FIG. 9 is a circuit diagram of a transmitting/receiving block.

The transmitting/receiving block 4 is connected to the microcomputer 3 of the indoor control unit 1. As shown in FIG. 9, the transmitting/receiving block 4 has a transmitting circuit 41 and a receiving circuit 42. Input terminals 43 of the transmitting circuit 41 and an output terminal 44 of the receiving circuit 42 are connected to the microcomputer 3, and an output terminals 45 of the transmitting circuit 41 and input terminals 46 of the receiving circuit 42 are connected to the both signal lines 21, 22. The transmitting/receiving block 4 is adapted to send a control signal serving as a transmission signal, upon reception of an instruction from the microcomputer 3, and also adapted to receive a control signal from other indoor control unit 12 or the like to supply a signal to the microcomputer 3.

A signal changeover switch 5 such as an analog switch or the like is disposed between the transmitting-/receiving block 4 and the both signal lines 21, 22. The signal changeover switch 5 forms signal switching means for inverting a signal sent from the transmitting-/receiving block 4.

Figure 10:
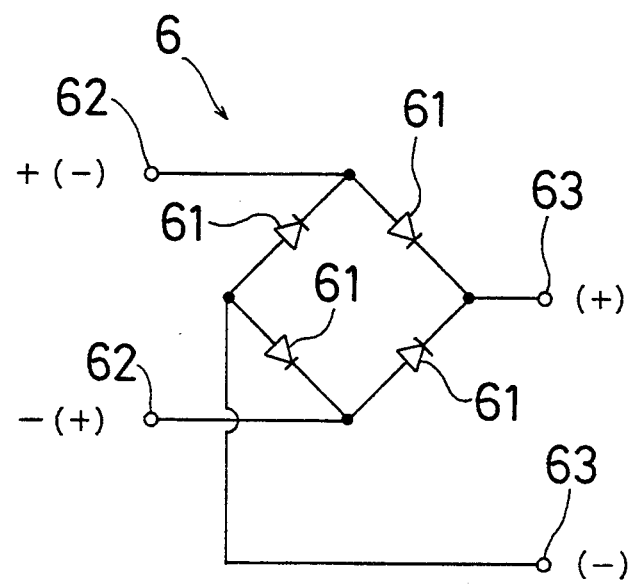
FIG. 10 is a circuit diagram of a rectifying block.

A rectifying block 6 and polarity judging means 7 are connected to the signal lines 21, 22. As shown in FIG. 10, the rectifying block 6 is a bridge circuit having diodes 61, in which input terminals 62 are connected to a power line (not shown), and output terminals 63 are connected to the both signal lines 21, 22 through choke coils 11, 12. The rectifying block 6 forms power superposing means for applying a predetermined DC voltage, e.g., +15 V, to the both signal lines 21, 22.

To supply power to the remote control 13, the rectifying block 6 superposes a DC voltage. The rectifying block 6 of a predetermined indoor control unit 12, for example, the indoor control unit 12 at the address [0], is so set as to apply a DC voltage to the signal lines 21, 22.

The polarity judging means 7 has a first light emitting diode (PHD1) and a second light emitting diode (PHD2) which are connected between the both signal lines 21, 22, a first phototransistor (PHT1) and a second phototransistor (PHT2). The first light emitting diode (PHD1) is adapted to emit light when the potential of the positive signal line 21 is higher than that of the negative signal line 22, and the second light emitting diode (PHD2) is adapted to emit light when the potential of the negative signal line 22 is higher than that of the positive signal line 21. The first phototransistor (PHT1) is adapted to be conducted to supply a homopolar signal to the microcomputer 3 when the first light emitting diode (PHD1) emits light, and the second phototransistor (PHT2) is adapted to be conducted to supply a heteropolar signal to the microcomputer 3 when the second light emitting diode (PHD2) emits light.

The microcomputer 3 has changeover control means 31 adapted to receive homopolar signals and heteropolar signals from the phototransistors (PHT1, PHT2). When the changeover control means 31 receives a heteropolar signal, the changeover control means 31 supplies a switching signal to the signal changeover switch 5 such that the signal changeover switch 5 inverts and switches a transmission signal.

The following will discuss a control operation of inverting and switching a transmission signal in the indoor control unit 12.

Figure 4:
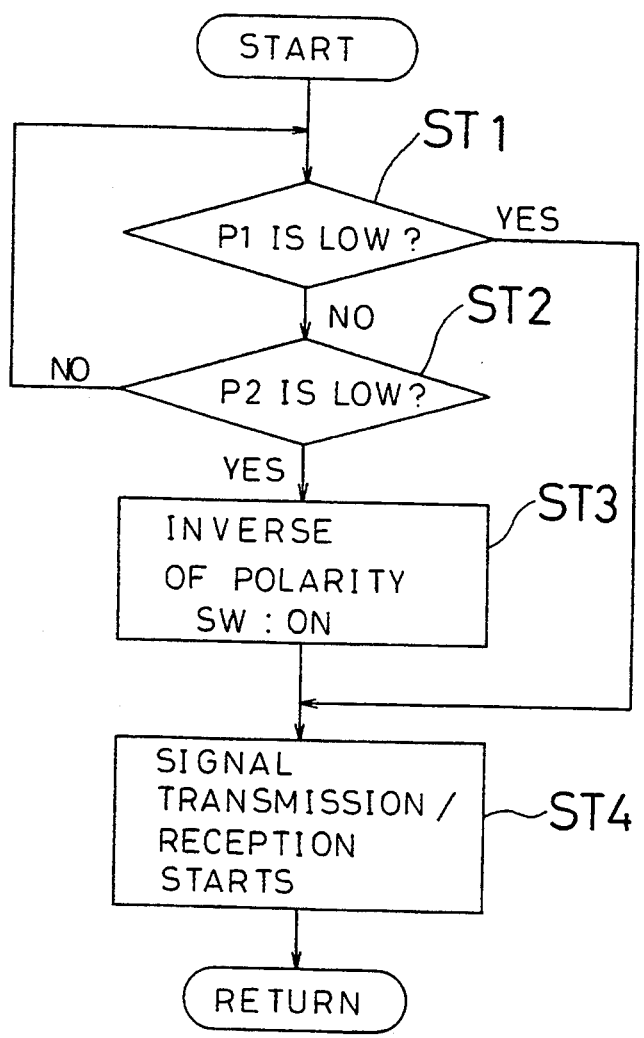
FIG. 4 is a control flow chart illustrating an operation of switching a transmission signal.

As shown in FIG. 4, when power is turned ON to start the sequence, the rectifying block 6 of a predetermined indoor control unit 12 applies a DC voltage of +15 V across the signal lines 21, 22. With the DC voltage superposed to the signal lines 21, 22, it is judged at a step ST1 whether or not the first light emitting diode (PHD1) emits light so that the first phototransistor (PHT1) supplies a low-level homopolar signal. More specifically, when the positive signal line 21 is normally connected to the positive side, the potential of the positive signal line 21 is higher than that of the negative signal line 22. Accordingly, the first light emitting diode (PHD1) emits light and the first phototransistor (PHT1) becomes low. In this connection, when the first phototransistor (PHT1) is high, judgement "NO" is made at the step ST1 and the sequence proceeds to a step ST2.

At the step ST2, it is judged whether or not the second light emitting diode (PHD2) emits light so that the second phototransistor (PHT2) supplies a low-level homopolar signal. More specifically, when the negative signal line 22 is reversely connected to the positive side, the potential of the negative signal line 22 becomes higher than that of the positive signal line 21. Accordingly, the second light emitting diode (PHD2) emits light and the second phototransistor (PHT2) becomes low. Thus, when the second phototransistor (PHT2) is high, judgment "NO" is made at the step ST2 and the sequence is returned to the step ST1.

When the second light emitting diode (PHD2) emits light and the second phototransistor (PHT2) is low to supply a heteropolar signal to the microcomputer 3, this means that the signal lines 21, 22 have been reversely connected. Then, the sequence proceeds from the step ST2 to a step ST3. At the step ST3, the changeover control means 31 supplies a switching signal so that the signal changeover switch 5 is switched. When the signal changeover switch 5 is switched, a transmission signal of the transmitting/receiving block 4 is inverted.

Then, the sequence proceeds from the step ST3 to a step ST4, where signal transmission/reception starts. That is, signal transmission/reception is made with the polarity conformed to a predetermined one.

At the step ST1, when the first light emitting diode (PHD1) emits light and the first phototransistor (PHT1) supplies a low-level homopolar signal to the microcomputer 3, this means that the signal lines 21, 22 have been normally connected to the positive and negative sides respectively. Accordingly, judgment "YES" is made at the step ST1. Then, the sequence proceeds from the step ST1 to the step ST4, where the transmitting-/receiving block 4 transmits and receives a transmission signal without a switching signal supplied from the changeover control means 31 to invert and switch the transmission signal by the signal changeover switch 5.

According to this particular embodiment, a DC voltage is applied across the signal lines 21, 22 to judge the polarity conformity, and when the polarity is not conformed to a predetermined one, a transmission signal is inverted. Accordingly, the polarity can be accurately conformed to a predetermined one and the polarity conformity can be judged without transmission of a control signal. This improves the efficiency of execution at the time of installation or the like.

Further, since the light emitting diodes (PHD1, PHD2) and the phototransistors, (PHT1, PHT2) are used, homopolar and heteropolar signals can be fetched without use of A/D ports of the microcomputer 3. Accordingly, the A/D ports of great utility value can be used as input ports for detection signals or the like of a variety of sensors.

Further, the rectifying block 6 is disposed for supplying power to the remote control 13. This eliminates the need to additionally dispose a rectifying block 6 as power superposing means for judging the polarity conformity. This reduces the number of component elements.

Figure 5:
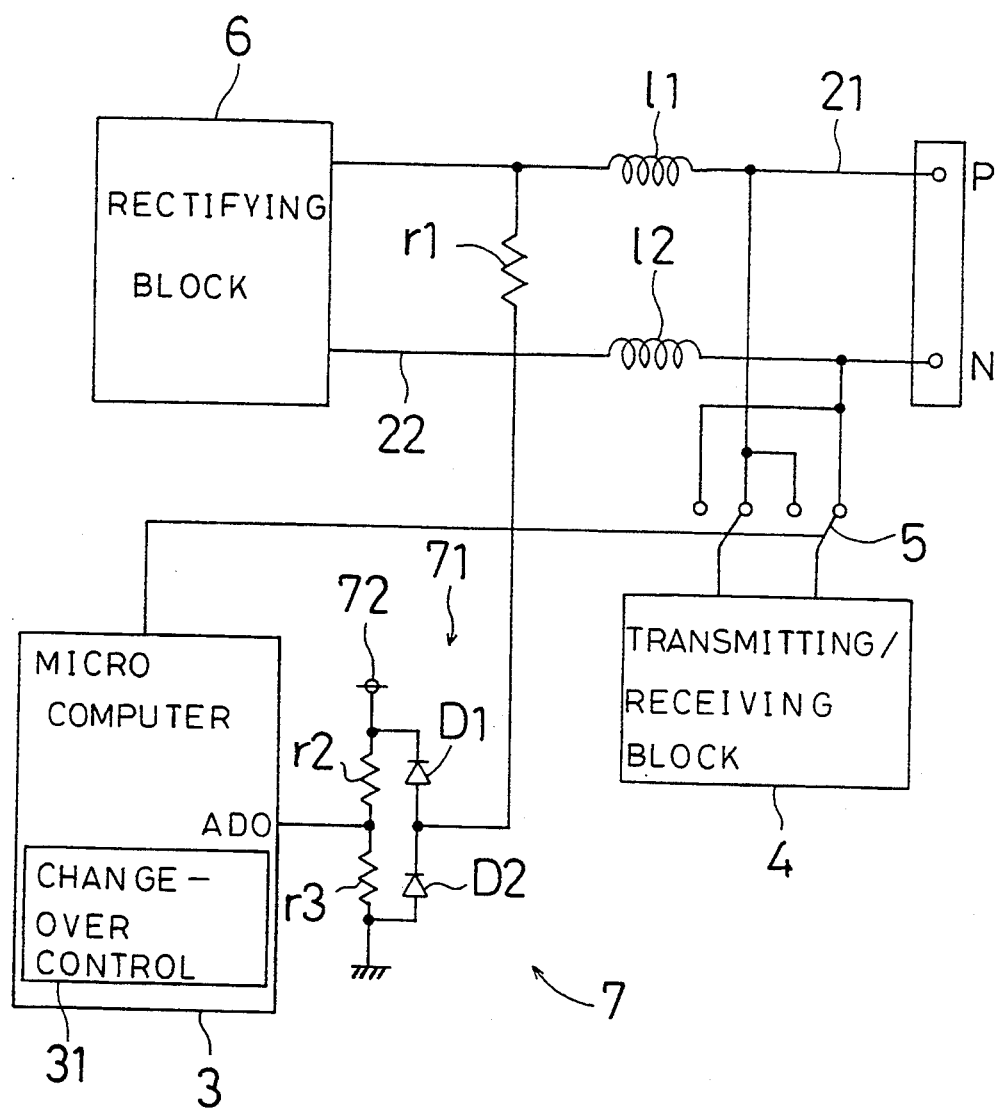
FIG. 5 is a schematic circuit diagram of an indoor control unit illustrating a second embodiment of the present invention.
Figure 6:
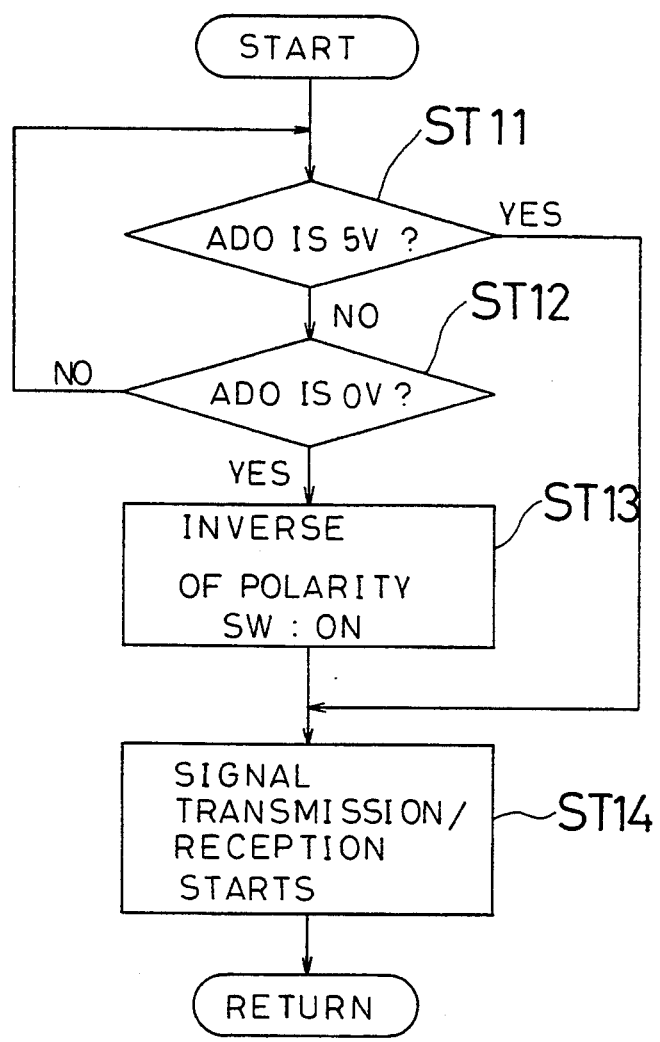
FIG. 6 is a control flow chart illustrating an operation of switching a transmission signal in the second embodiment.

FIGS. 5 and 6 show a second embodiment of the present invention, in which the polarity judging means 7 in the embodiment above-mentioned is formed by a voltage dividing circuit 71.

As shown in FIG. 5, an A/D port of the microcomputer 3 of each indoor control unit 12 is connected to the voltage dividing circuit 71, which is connected to the positive signal line 21 through resistance r1. In the voltage dividing circuit 71, the A/D port of the microcomputer 3 is connected between two resistances r2, r3 connected in series to a power supply 72, and diodes D1, D2 are connected in parallel to the resistance r2, r3. The voltage dividing circuit 71 is arranged such that, when the positive signal line 21 is normally connected to the positive side, a homopolar signal of 5 V is supplied to the microcomputer 3, and when the positive signal line 21 is reversely connected to the negative side, a heteropolar signal of 0 V is supplied to the microcomputer 3.

In this second embodiment, other arrangement is similar to that of the first embodiment shown in FIG. 3.

The following will discuss a control operation of inverting and switching a transmission signal in the indoor control unit 12.

As shown in FIG. 6, when power is turned ON to start the sequence, the rectifying block 6 of a predetermined indoor control unit 12 applies a DC voltage of +15 V across both signal lines 21, 22. With the DC voltage superposed on the signal lines 21, 22, it is judged at a step ST11 whether or not the voltage dividing circuit 71 supplies a homopolar signal of 5 V. More specifically, when the positive signal line 21 is normally connected to the positive side, the potential of the positive signal line 21 is higher than that of the negative signal line 22. Accordingly, the voltage of 5 V is supplied to the microcomputer 3. In this connection, when the voltage dividing circuit 71 does not supply a homopolar signal of 5 V, judgment "NO" is made at the step ST11 and the sequence proceeds to a step ST12.

At the step ST12, it is judged whether or not the voltage dividing circuit 71 supplies a heteropolar signal of 0 V. More specifically, when the negative signal line 22 is reversely connected to the positive side, the potential of the negative signal line 22 is higher than that of the positive signal line 21. Accordingly, the output voltage of the voltage dividing circuit 71 is lowered to 0 V. That is, when the voltage dividing circuit 71 does not supply a heteropolar signal of 0 V, judgment "NO" is made at the step ST12 and the sequence is returned to the step ST11.

When the voltage dividing circuit 71 supplies a heteropolar signal of 0 V to the microcomputer 3, this means that the signal lines 21, 22 have been reversely connected. Then, the sequence proceeds from the step ST12 to a step ST13, where the changeover control means 31 supplies a switching signal to switch the signal changeover switch 5. When the signal changeover switch 5 is switched, a transmission signal of the transmitting/receiving block 4 is inverted.

Thereafter, the sequence proceeds from the step ST13 to a step ST14, where signal transmission/reception starts. This is, signal transmission/reception is made with the polarity conformed to a predetermined one.

At the step ST11, when the voltage dividing circuit 71 supplies a homopolar signal of 5 V, this means that the signal lines 21, 22 have been normally connected to the positive and negative sides respectively. Accordingly, judgment "YES" is made. Then, the sequence proceeds from the step ST11 to the step ST14, where the transmitting/receiving block 4 transmits and receives a transmission signal without a switching signal supplied from the changeover control means 31 to invert and switch the transmission signal by the signal changeover switch 5.

According to this second embodiment, since the voltage dividing circuit 71 is disposed, polarity conformity can be judged with a less current consumption as compared with the first embodiment using light emitting diodes (PHD1, PHD2) and the phototransistors (PHT1, PHT2).

Figure 7:
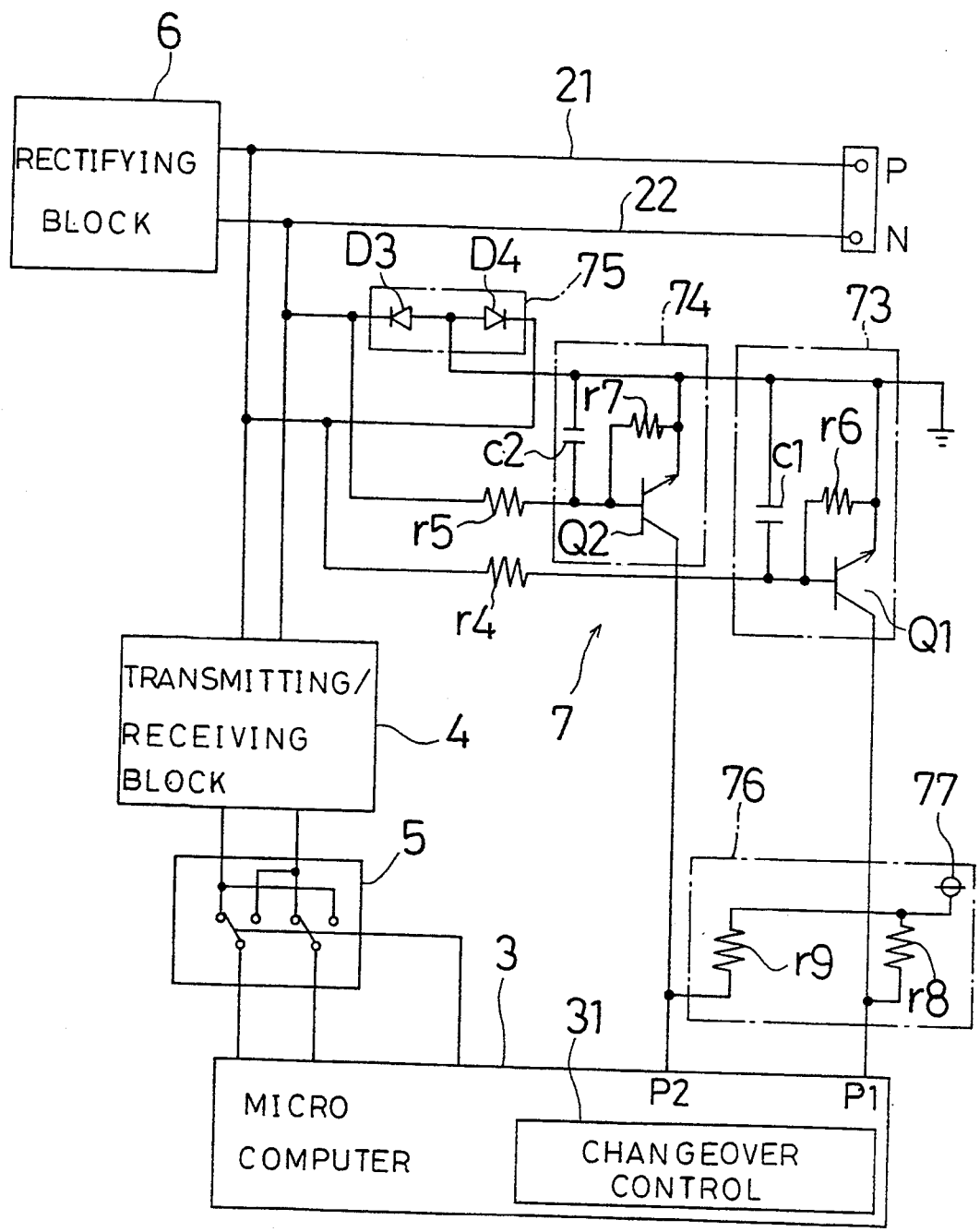
FIG. 7 is a schematic circuit diagram of an indoor control unit illustrating a third embodiment of the present invention.
Figure 8:
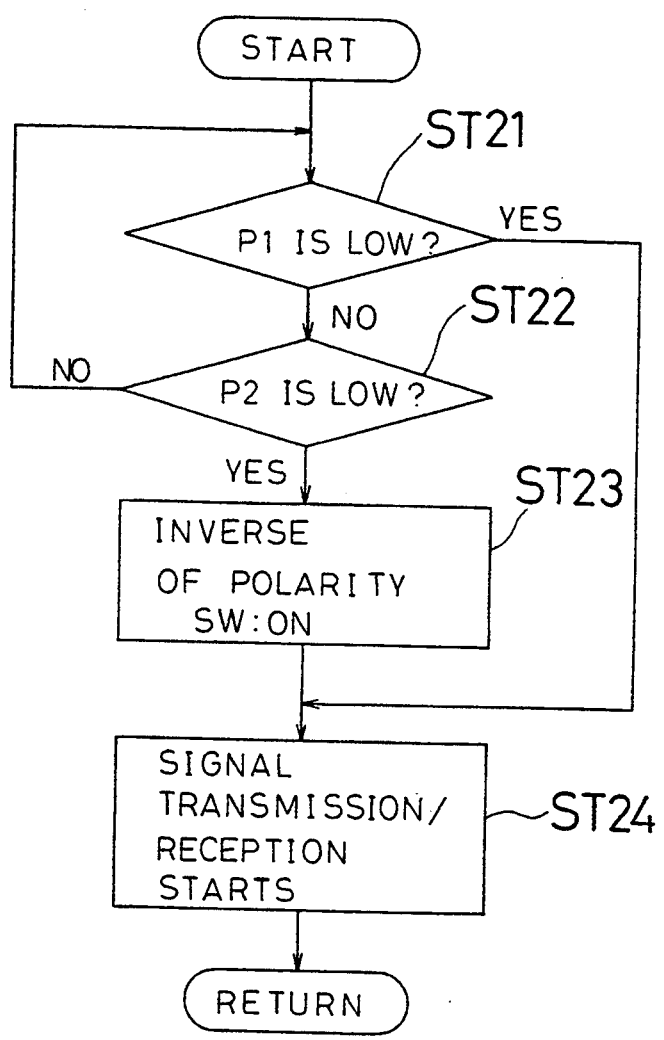
FIG. 8 is a control flow chart illustrating an operation of switching a transmission signal in the third embodiment.

FIGS. 7 and 8 show a third embodiment of the present invention, where the polarity judging means 7 is formed by two transistors.

As shown in FIG. 7, the polarity judging means 7 has a positive-side judging unit 73 having a first transistor Q1, and a negative-side judging unit 74 having a second transistor Q2. In the first transistor Q1 of the positive-side judging unit 73, the base is connected to the positive signal line 21 through a resistance r4, the collector is connected to a general-purpose port P1 of the microcomputer 3, and the emitter is connected to the negative signal line 22 through a rectifying circuit 75 having two diodes D3, D4, and also connected to the ground.

In the second transistor Q2 of the negative-side judging unit 74, the base is connected to the negative signal line 22 through resistance r5, the collector is connected to a general-purpose port p2 of the microcomputer 3, and the emitter is connected to the positive signal line 21 through the rectifying circuit 75 and also connected to the ground. Resistances r6, r7 and capacitors c1, c2 are connected between the bases and the emitters of the first transistor Q1 and the second transistor Q2.

A pull-up circuit 76 is connected to the collectors of the first transistor Q1 and the second transistor Q2. In the pull-up circuit 76, resistances r8, r9 are connected to a power supply 77 such that the collector sides of the transistors Q1, Q2 are maintained at a predetermined potential. The positive-side judging unit 73 and the negative-side judging unit 74 are arranged as follows. A DC voltage is superposed between the signal lines 21, 22. Accordingly, when the potential of the positive signal line 21 is higher, the first transistor Q1 is turned ON so that the general-purpose port P1 of the microcomputer 3 becomes low to supply a homopolar signal. When the potential of the negative signal line 22 is higher, the second transistor Q2 is turned ON so that the general-purpose port P2 becomes low to supply a heteropolar signal.

In the third embodiment, other arrangement including the disposition of the signal changeover switch 5 between the transmitting/receiving block 4 and the microcomputer 3, is similar to that of the first embodiment shown in FIG. 3.

The following will discuss a control operation of inverting and switching a transmission signal in the indoor control unit 12.

As shown in FIG. 8, when power is turned ON to start the sequence, the rectifying block 6 of a predetermined indoor control unit 12 applies a DC voltage of +15 V across both signal lines 21, 22. With the DC voltage superposed on the signal lines 21, 22, it is judged at a step ST21 whether or not the general-purpose port p1 of the microcomputer 3 is low. More specifically, when the positive signal line 21 is normally connected to the positive side, the potential of the positive signal line 21 is higher than that of the negative signal line 22. Accordingly, a high signal is supplied to the base of the first transistor Q1 in the positive-side judging unit 73 to turn ON the first transistor Q1. As a result, an input-side current from the positive signal line 21 flows to the negative signal line 22 through the rectifying circuit 75, and an output-side current from the pull-up circuit 76 flows to the ground. Accordingly, the general-purpose port p1 of the microcomputer 3 becomes low so that the positive-side judging unit 73 supplies a homopolar signal.

When the general-purpose port p1 of the microcomputer 3 is high, judgment "NO" is made at the step ST21 and the sequence proceeds to a step ST22. At the step ST22, it is judged whether or not the general-purpose port p2 of the microcomputer 3 is low. More specifically, when the negative signal line 22 is connected to the positive side, the potential of the negative signal line 22 is higher than that of the positive signal line 21. Accordingly, a high signal is supplied to the base of the second transistor Q2 in the negative-side judging unit 74 to turn ON the second transistor Q2. As a result, an input-side current from the negative signal line 22 flows to the positive signal line 21 through the rectifying circuit 75, and an output-side current from the pull-up circuit 76 flows to the ground. Accordingly, the general-purpose port p2 of the microcomputer 3 becomes low so that the negative-side judging unit 74 supplies a heteropolar signal.

When the general-purpose port p2 of the microcomputer 3 is high, judgment "NO" is made at the step ST22 and the sequence is returned to the step ST21. When the general-purpose port p2 of the microcomputer 3 is low, this means that the signal lines 21, 22 have been reversely connected; that is, the negative signal line 22 has been connected to the positive side. Accordingly, judgment "YES" is made at the step ST22 and the sequence proceeds to a step ST23, where the changeover control means 31 supplies a switching signal so that the signal changeover switch 5 is switched. When the signal changeover switch 5 is switched, a transmission signal of the transmitting/receiving block 4 is inverted.

Thereafter, the sequence proceeds from the step ST23 to a step 24, where signal transmission/reception starts. That is, signal transmission/reception is made with the polarity conformed to a predetermined one.

At the step ST21, when the first transistor Q1 of the positive-side judging unit 73 is turned ON and the general-purpose port p1 of the microcomputer 3 is low, this means that the signal lines 21, 22 have been connected to the positive and negative sides, respectively; that is, the positive signal line 21 is connected to the positive side. Accordingly, judgment "YES" is made at the step ST21, and the sequence then proceeds from the step ST21 to the step ST24, where the transmitting/receiving block 4 transmits and receives a transmission signal without a switching signal supplied from the changeover control means 31 to invert and switch the transmission signal by the signal changeover switch 5.

According to the third embodiment, since the polarity can be judged based on ON/OFF signals of the first transistor Q1 and the second transistor Q2, polarity conformity can be judged with a less current consumption. Further, since the general-purpose ports p1, p2 of the microcomputer 3 can be utilized, the A/D ports of great utility value can be used as input ports of other control signals.

In the foregoing, the embodiments have been discussed as to the operation control apparatus 1 of an air conditioning machine, but the present invention may be applied to any of a variety of transmission apparatus for other machines than the air conditioning machine.

Further, the embodiments have been discussed as to the transmission apparatus between the indoor control units 12 and the remote controls 13. However, it is a matter of course that the present invention may be applied to transmission apparatus disposed between the indoor control units 12 and the central control unit 14.

Further, the transmitting/receiving block 4 is disposed in each of the indoor control units 12. However, the transmitting/receiving block 4 may be disposed only in one indoor control unit 12, or may be disposed independently from each of the control units 11, 12, 13.

What is claimed is:

1. In a transmission apparatus including a plurality of control units, each having a transmitting/receiving means, connected to one another through a positive signal line and a negative signal line, wherein bidirectional signal transmission is carried out with a predetermined polarity among said control units with said signal lines connected to a power superposing means by way of choke coils for applying a predetermined DC voltage to said signal lines;

each of said control units comprising:
a signal switching means connected to said transmitting/receiving means for inverting and switching a transmission signal sent or received by said transmitting/receiving means;
a polarity judging means for supplying a homopolar signal when a potential of said positive signal line is higher than a potential of said negative signal line, and for supplying a heteropolar signal when the potential of said positive signal line is lower than the potential of said negative signal line; and
a changeover control means for supplying a switching signal to said signal switching means such that said signal switching means inverts and switches said transmission signal when said polarity judging means supplies a heteropolar signal to said changeover control means;
said polarity judging means including a first light emitting element for emitting light when the potential of the positive signal line is higher than the potential of the negative signal line, a second light emitting element for emitting light when the potential of the negative signal line is higher than the potential of the positive signal line, a first light receiving element for supplying the homopolar signal when said first light emitting element emits light, and a second light receiving element for supplying the heteropolar signal when said second light emitting element emits light;
wherein each signal line has one end connected to the light emitting element on a first side of the power superposing means and an other end connected to the signal switching means by way of said choke coils on the opposing side of the power superposing means.

2. In a transmission apparatus including a plurality of control units, each having a transmitting/receiving means, connected to one another through a positive signal line and a negative signal line, wherein bidirectional signal transmission is carried out with a predetermined polarity among said control units with said signal lines connected to a power superposing means by way of choke coils for applying a predetermined DC voltage to said signal lines;

each of said control units comprising:
a signal switching means connected to said transmitting/receiving means for inverting and switching a transmission signal sent or received by said transmitting/receiving means;
a polarity judging means for supplying a homopolar signal when a potential of said positive signal line is higher than a potential of said negative signal line, and for supplying a heteropolar signal when the potential of said positive signal line is lower than the potential of said negative signal line; and a changeover control means for supplying a switching signal to said signal switching means such that said signal switching means inverts and switches said transmission signal when said polarity judging means supplies a heteropolar signal from said changeover control means;

wherein the polarity judging means is formed by a voltage dividing circuit which is connected to the positive signal line for dividing the voltage and for supplying a high-voltage homopolar signal when the potential of said positive signal line is higher than the potential of said negative signal and for supplying a low-voltage heteropolar signal when the potential of the negative signal line is higher than the potential of the positive signal;

wherein each signal line has one end connected to the voltage dividing circuit on a first side of the power superposing means on an other end connected to the signal switching means on the opposing side of the power superposing means.

3. In a transmission apparatus including a plurality of control units each having transmitting/receiving means, connected to one another through a positive signal line and a negative signal line, wherein bidirectional signal transmission is carried out with a predetermined polarity among said control units, with said signal lines connected to a power superposing means for applying a predetermined DC voltage to said signal lines;

each of said control units comprising:

a signal switching means connected to said transmitting/receiving means for inverting and switching a transmission signal sent or received by said transmitting/receiving means;

a polarity judging means for supplying a homopolar signal when a potential of said positive signal line is higher than the potential of said negative signal line, and for supplying a heteropolar signal when the potential of said positive signal line is lower than the potential of said negative signal line; and changeover control means for supplying a switching signal to said signal switching means such that said signal switching means inverts and switches said transmission signal when said polarity judging means supplies a heteropolar signal to said changeover control means;

wherein the polarity judging means includes:

a positive-side judging unit having a first transistor for supplying a homopolar signal when the potential of the positive signal line is higher than the potential of the negative signal line; the first transistor having a base connected to the positive signal line, a collector connected to the changeover control means and an emitter connected to said signal lines and the ground;

a negative-side judging unit having a second transistor for supplying a heteropolar signal when the potential of the negative signal line is higher than the potential of the positive signal line; the second transistor having a base connected to said negative signal line, a collector connected to said changeover control means and an emitter connected to said signal lines and the ground;

a rectifying circuit including at least one diode connected to the emitters of said first transistor and said second transistor; and a pull-up circuit connected to the collectors of said first transistor and said second transistor.

* * * * *